United States Patent
Haeberle et al.

(10) Patent No.: US 7,667,988 B2
(45) Date of Patent: Feb. 23, 2010

(54) FILTER

(75) Inventors: Norbert Haeberle, Lommiswil (CH); Peter Arthur Kull, Rüttenen (CH); Andrew Cecil Tucker, Bendigo (AU)

(73) Assignee: Schaffner EMV AG, Luterbach (CH)

( * ) Notice: Subject to any disclaimer, the term of this patent is extended or adjusted under 35 U.S.C. 154(b) by 32 days.

(21) Appl. No.: 11/619,510

(22) Filed: Jan. 3, 2007

(65) Prior Publication Data

US 2007/0159860 A1 Jul. 12, 2007

Related U.S. Application Data

(63) Continuation of application No. PCT/EP2005/053613, filed on Jul. 25, 2005.

(60) Provisional application No. 60/590,336, filed on Jul. 23, 2004.

(51) Int. Cl.
*H02M 1/12* (2006.01)
*H02M 1/14* (2006.01)

(52) U.S. Cl. ............................ 363/39; 363/44; 363/47

(58) Field of Classification Search ................ None
See application file for complete search history.

(56) References Cited

U.S. PATENT DOCUMENTS 4,402,028 A 8/1983 Udren et al.
5,666,255 A 9/1997 Muelleman
5,905,642 A * 5/1999 Hammond ................... 363/37
6,122,183 A * 9/2000 He et al. ...................... 363/44
6,775,157 B2 * 8/2004 Honda ......................... 363/39
6,839,249 B2 * 1/2005 Kalman et al. ............... 363/35
2002/0171473 A1 11/2002 Pelly
2003/0128558 A1 7/2003 Takahashi et al.
2003/0218498 A1 11/2003 Pelly
2004/0008527 A1 1/2004 Honda

OTHER PUBLICATIONS

Quian Zhaoming et al., "Status of electromagnetic compatibility research in power electronics," The Third International Power Electronics and Motion Control Conference, Aug. 15-18, 2000, IEEE, vol. 1, Aug. 15, 2000, pp. 46-57.

I. Takahashi et al., "Active EMI filter for switching noise of high frequency inverters," Power Conversion Conference, Nagaoka, Japan, Aug. 3-6, 1997, IEEE, vol. 1, Aug. 3, 1997, pp. 331-334.

* cited by examiner

*Primary Examiner*—Albert W Paladini
*Assistant Examiner*—Dharti H Patel
(74) *Attorney, Agent, or Firm*—Blank Rome LLP

(57) ABSTRACT

EMC filter, for connection between a mains supply network and a mains-operated appliance to reduce conduction noise between said supply network and said appliance, comprising a voltage divider connected to said mains network, for generating a voltage lower than a voltage of said mains network; rectifying means, connected to an output of said voltage divider, for generating a DC voltage; and an electronic active circuit, supplied by said DC voltage, for absorbing a noise current transmitted between said supply network and said appliance.

25 Claims, 9 Drawing Sheets

US 7,667,988 B2

FILTER

REFERENCE DATA

This application is a continuation of International Patent Application PCT/EP2005/053613 (WO2006/008322) filed on Jul. 25, 2005, claiming priority of U.S. provisional application 60/590,336 of Jul. 23, 2004, the contents whereof are hereby incorporated.

FIELD OF THE INVENTION

This patent application relates to electrical filters for filtering an unwanted noise component from an electrical or electronic circuit or line and more particularly, but not exclusively, to electromagnetic compatibility filters for mains lines or distribution lines at mains frequency.

DESCRIPTION OF RELATED ART

Electromagnetic compatibility (EMC) is an increasingly critical factor in the electric and electronic industry nowadays. A large number of electric circuits and appliances exist, which are liable to generate unwanted electrical noise, or to suffer from noise generated by other circuits or appliances.

The conducted noises and disturbances are generally dealt with by inserting a low-pass LC filter on the mains supply line of the noise-generating devices or of the noise-sensitive devices. Such filters attenuate the unwanted frequency components to a harmless level. Many filter topologies, including the classic "L, "T" and "pi" filter topologies, can be employed.

European Patent application EP1069673 shows an example of a three-phase noise suppression filter comprising passive elements.

Passive EMC filters have been proven effective in a number of applications. A shortcoming of this technique, however, is that in order to attain the required attenuation level, high-value capacitors and inductances are needed for this application. The size and cost of the resulting filter are mainly determined by these large components, in particular when high attenuation of common mode noise is needed Moreover, the leakage current is directly proportional to the capacity of the filter capacitors.

It is also known to employ active elements in noise suppression filters, for example as in European patent EP0995266. The use of active elements allows the use of smaller inductances and capacitors, thereby providing more compact filters. The existing active filters, however, remain less reliable than their traditional passive homologues, can fail due to overvoltage or overtemperature breakdown, or may exhibit instability and oscillations.

It is an aim of the present invention to provide an EMC filter which is more compact and reliable than the known devices.

It is a further aim of the present invention to provide an EMC filter combining a high attenuation and a low leakage current.

It is also an aim of the present invention to provide an EMC filter with a production cost lower than the known devices.

BRIEF SUMMARY OF THE INVENTION

These aims are attained by the device which is the subject of the appended independent claims, optional and additional useful features being introduced in the dependent claims.

DETAILED DESCRIPTION OF THE INVENTION

Figure 4:
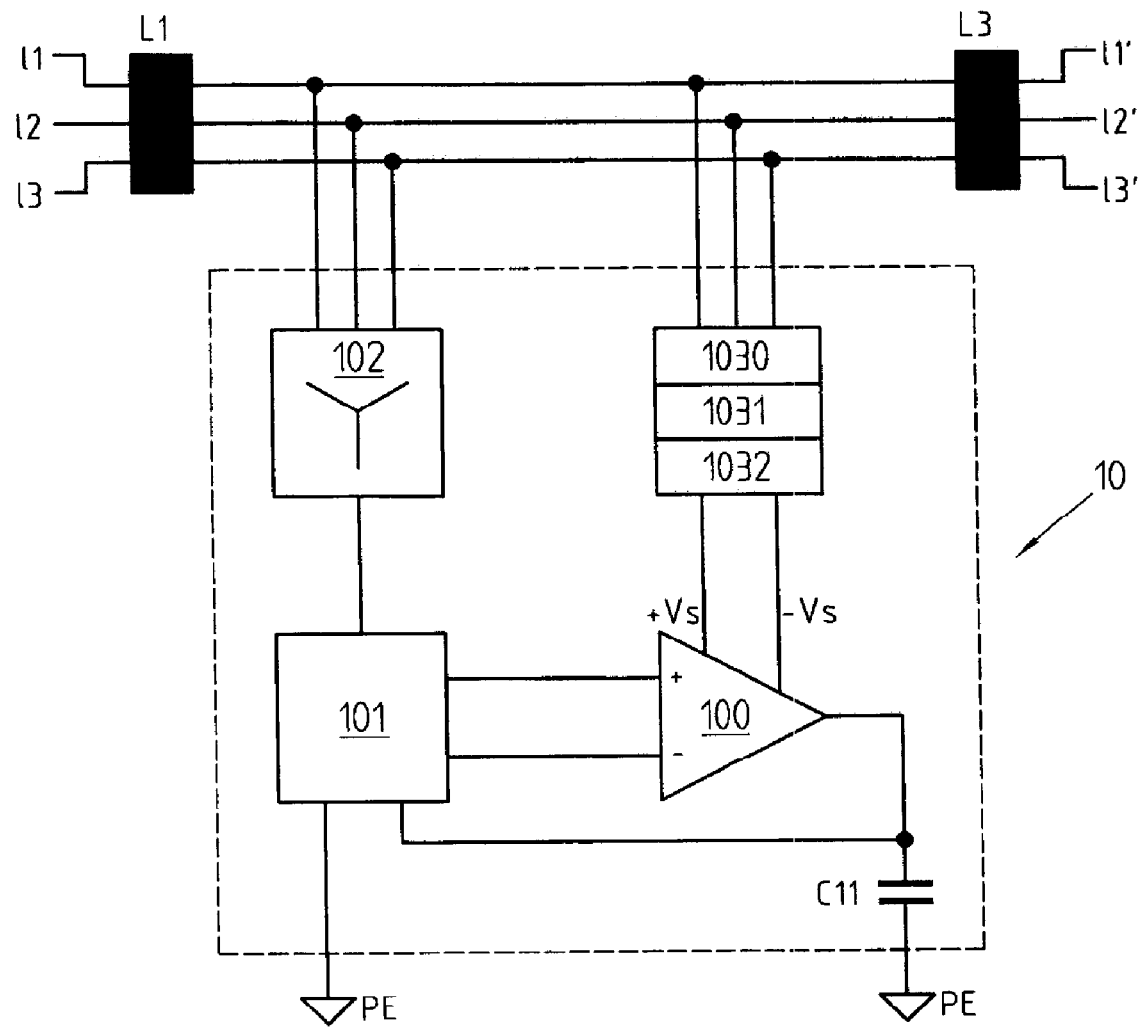
FIG. 4 shows, in bloc diagrammatic form, an EMC active filter according to the invention.

Referring first to FIG. 4, the filter circuit of the invention comprises at least one inductive part L1, L3 in series with each power line I1, I2, I3, I1', I2', I3' and one active shunt circuit 10 between each line and a current sink, for example the earth. The current to be filtered flows through each inductance from the mains supply line, on the left of FIG. 4, to the load on the right of FIG. 4.

The embodiment illustrated on FIG. 4 is built as a T-filter and comprises two current compensated inductances L1 and L3 and an active shunt between the middle point of the inductances and the earth. The active shunt 10 of the invention may however be used in other filter arrangements, for example in filter arrangements comprising only one inductance in series with each power line. The inductive part may comprise any combination of current compensated and not current compensated inductances in each line.

The active shunt 10 acts as a capacitive bypass for attenuating high frequency voltage variations, notably noise, between the inductances L1 and L3. It comprises an amplifier 100, preferably a high-voltage; high-power operational amplifier, a passive network 101, a star-point circuit 102 and a DC floating power supply 103.

The star-point circuit 102 includes passive elements, for example resistors and/or capacitors, connected between each line and a star-point 1010. The voltage at 1010 is fed to the passive network 101 which may comprise, for example, an arrangement of capacitors and/or resistors. The passive network is also connected to the reference point, for example to the earth point PE, and to the output of the operational amplifier 100. The passive network 101 is arranged so as to reference one input of the amplifier 100 to the earth potential and the other input to the star-point 1010; the output of the operational amplifier is fed back to the inverting input of the amplifier 100 and to the capacitor C11.

In this way the operational amplifier 100 continuously tries to keep the input 1010 at the potential of the earth over the filter bandwidth. The current driven by the amplifier 100 in order to compensate for voltage variations at 1010 is fed from the power lines I1-I3 through the DC floating power supply 103. Thus any voltage variation at 1010 due to noise in the filter bandwidth will drive current from the power lines to earth through the power supply and the capacitor C11.

The DC power supply 103 of the invention comprises a rectifier 1031 for converting the AC power voltage available on lines L1-I3 into the DC supply voltages +Vs, −Vs, available to the operational amplifier 100.

The DC power supply 103 of the invention further comprises a voltage reducing circuit 1030 for reducing the DC voltage supplied to the amplifier 100 to a suitable level, and to reduce the power loss through this amplifier.

In a preferred embodiment, the DC power supply further comprises security elements 1032 for protecting the amplifier against overvoltage, fast or important du/dt or di/dt variations, and/or for detecting and transmitting anomaly conditions.

The embodiment of the invention shown on FIG. 4 filters common mode noise on the star point 1010. In a various embodiment (not shown), three active filters are used for filtering differential mode noise between each pair of power lines supplies. Each differential mode active filter preferably includes its DC power supply with a rectifier and a voltage reducing circuit, its own operational amplifier 100, and its own passive network 101. The differential mode active filters may further include common and/or independent anomaly conditions detections. The three common mode active filters may be used instead or in addition to the differential active filter of FIG. 1. Voltage reducing circuit may be provided in the differential mode active filters but not in the common mode active filter, or just the opposite, on in both types of filters.

Figure 1:
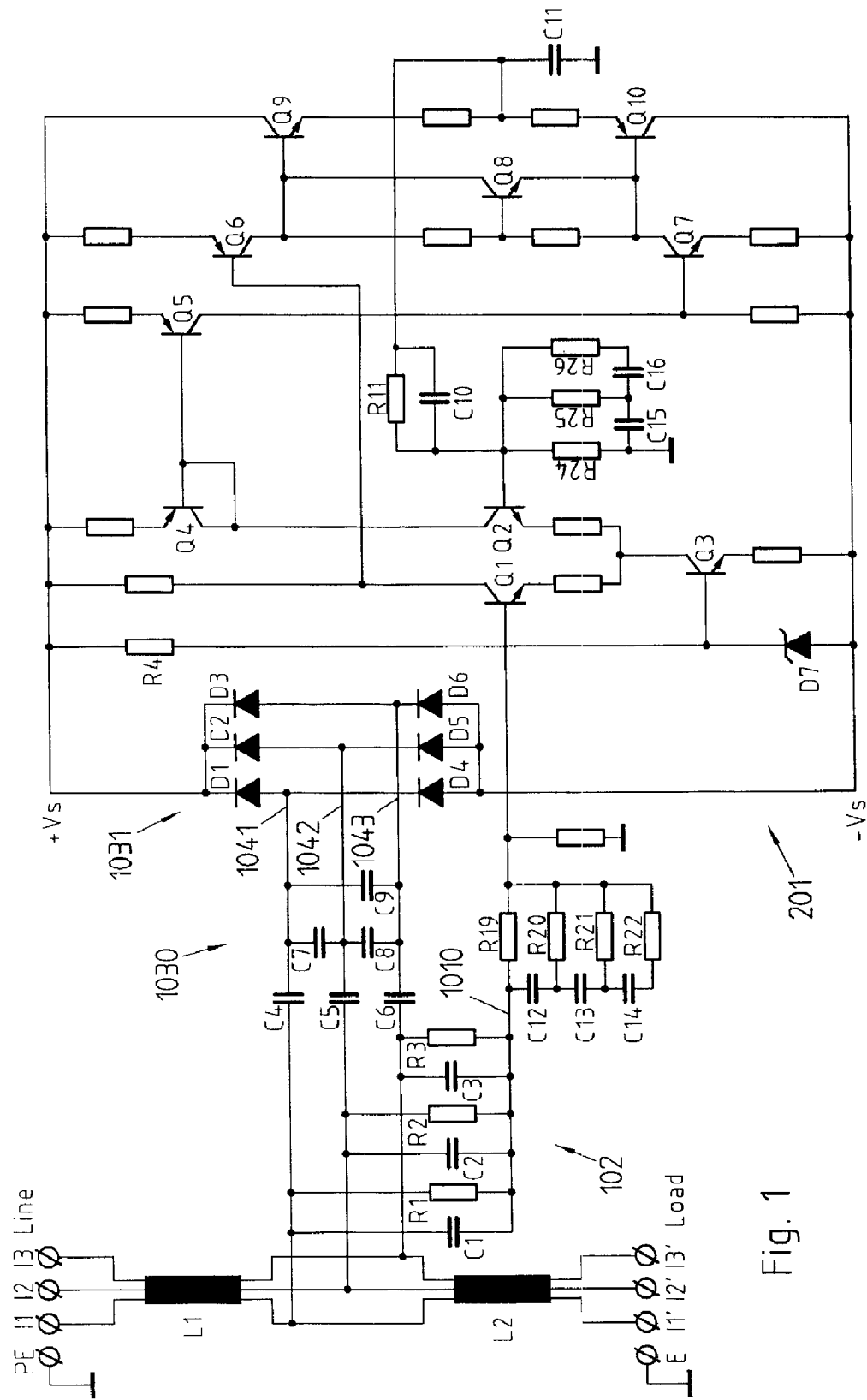
FIG. 1 shows a schematic of an EMC filter according to a first aspect of the invention.

FIG. 1 represents a more detailed schematic diagram of an example of EMC active filter according to the invention. Power is fed through the filter from each line I1-I3, I1'-I3' to load via two inductances, in this case via ferrite beads L1 and L2. A star-point system 102 comprises an X capacitor network C1-C3 and bleed resistors R1-R3 to provide differential mode attenuation with assistance from stray line inductance. The X capacitor network also serves to make a solid RF connection to share common mode current between phases. The capacitor network comprises one capacitor C1-C3 and one resistor between the connection point of the two inductances and one common point 1010 which also serves as an input for the active portion of the filter.

C4-C9 form a voltage divider 1030 which serves to reduce the mains voltage to a level suitable for the active elements and which will also reduce power loss. The divider 1030 will also supply only a limited amount of power, for example 290 VAC on the output lines 1041-1043 instead of 400 VAC, with a limited maximum power so that in the event of a very large noise signal appearing, the voltage will collapse and thus the circuit will be protected from power overload. The voltage divider is advantageously made of capacitive elements for acting mainly on the higher frequency voltage components, for reducing the power losses, and for attenuating high frequency symmetric noise voltages. Other types of voltage dividers, including voltage dividers made of resistors or of other passive or active components, are possible but less advantageous for most applications.

The capacitive elements of the illustrated voltage divider 1030 are connected in delta; a star connection, comprising one capacitor C4-C6 in series with each line 1041-1043 and a second capacitor between each line and a common point, is also possible.

In the illustrated example, the voltage divider 1030 divides the AC voltage before rectification. Voltage dividers acting on the rectified DC voltage are also possible, although this would require, among others, larger components in the voltage divider.

Other types of voltage reducing circuits 1030 may be used for supplying the active portion of the filter 1 with an adequate voltage. The voltage reduction circuit may also be combined with the rectifier 1031.

Advantageously, the circuit of the invention does not include fuses. The capacitive divider 1030 comprising, in this case, the capacitors C4-C9 limits the current to harmless levels, even in the case of a short circuit. By avoiding fuses, the stray inductance of the noise current path can be reduced.

A rectifier 1031 comprising a bridge D1-D6 provides a full rectification of the 3 phase mains and is used both for providing a DC supply +Vs, −Vs for the active filter circuit, end as a current path for the noise.

In the presented embodiment, the DC supply for the active part of the filter circuit is obtained by the capacitive divider 1030 and the bridge of diodes D1-D6. Other rectifying means, for example an AC-DC converter, could also be used for this function and are comprised in the scope of the present invention.

The active portion of the filter 1, which we will describe now, is arranged in order to continuously try to keep the input 1010 at the potential of the earth. The current path includes the amplifier supplying lines +Vs, −Vs and the earth-connected capacitor C11, which acts in the bandwidth of the filter like a very low impedance element due to the active circuit.

R4 and D7 form a voltage reference for the current source Q3. This provides for example 1 mA bias current to the differential pair Q1 and Q2 whose base terminals form the differential input to the complete amplifier. Q1 and Q2 share the current for current source Q3. The collector of Q1 is a current source which controls current to the positive rail. The collector of Q2 controls current to the negative rail via the current mirror Q4 and Q5.

Q6 and Q9 form a complementary Darlington to drive positive current through C11 while Q7 and Q10 do the same for negative current. Q6 and Q7 are bias to about 1 mA, for example. Q9 and Q10 are bias for example to about 10 mA by Q8 whose collector-emitter voltage can be set to just about two diode drops. Q1 input is biased via R23 to earth and R11/C10 is a feedback impedance. The circuit is arranged in such a way that C11 follows earth potential at low frequencies (say below 1 kHz for example).

Resistor/capacitor chains R19,R20,R21,R22,C12,C13, C14 and R24,R25,R26,C15,C16 are lag-lead networks which ensure a maximum leading base current of 45 degrees (see open loop analysis). C10 provides a dominant pole roll off at high frequencies (say above 500 kHz). Note that the amplifier elements are all dc coupled and no bypass capacitors are used. This helps to ensure no unforeseen phase shifting which may induce resonance.

The circuit 201 following the rectifier stages 1031 is equivalent, in this embodiment, to the combination of elements 100 and 101 of FIG. 4.

The stability of the circuit of FIG. 1 will now be analyzed and discussed; the circuits shown on FIGS. 3a to 3d illustrate this explanation.

Open Loop

Figure 3A:
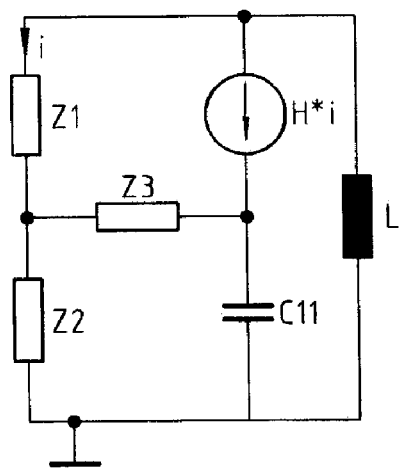
FIGS. 3a to 3d show equivalent circuits useful to the stability analysis of the circuit of the invention.
Figure 3B:
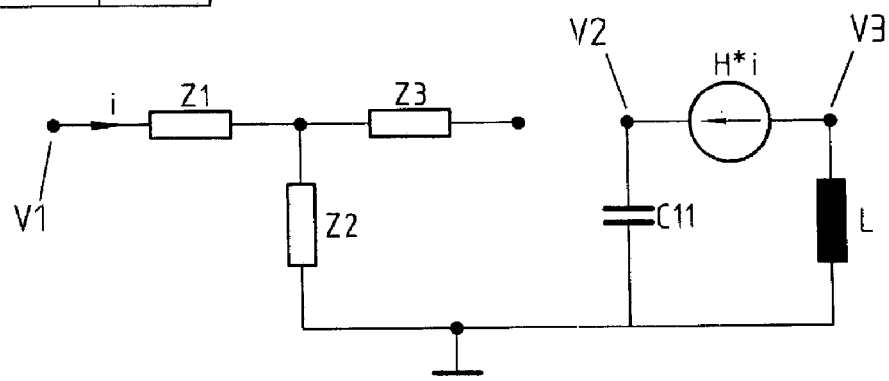

As visible on FIG. 3b, representing the open loop behavior of the circuit, a voltage V1 is applied to amplifier input RC chain. The resulting base current (i) in Q1 and Q2 will be limited to a maximum of 45 degrees leading. The output current H*i is in phase with the input current, where H is the overall current gain. This output current passes through C11 resulting in V2 and effective impedance L of the power input, which includes L1 and the supply impedance (LISN) resulting in V3. If we ignore V2 for the moment, the stability criterion says that V3 must not be in phase with V1.

The maximum phase shift of V3 with respect to the output current (in the power input) will be 90 degrees leading (where L1 and LISN are purely inductive). Therefore, in the worst case V3 will lag V1 by 45 degrees (i.e. the phase margin is safe at 45 degrees). The voltage V2 always lags the output current by 90 degrees. It is only important at low frequencies where it follows earth potential. At higher frequencies it should be isolated from the base inputs.

Closed Loop

Referring now to the closed-loop equivalent circuit of FIG. 3a, a noise current I is applied to L2. This current flows almost entirely via the amplifier output (H*i) and to earth via C11. The resulting input current (i) produces a shunt voltage $V_1=Z_{in}*i$, where $Z_{in}$ is the impedance of the input RC chain. Put in terms of output current $V1=Z_{in}*I/H$.

Turning this around, $Zs=V1/I_{noise}=Z_{in}/H$, where $Z_s$ is the active shunt impedance. So the shunt impedance can be controlled by the ratio of $Z_{in}$ and H.

Figure 3C:
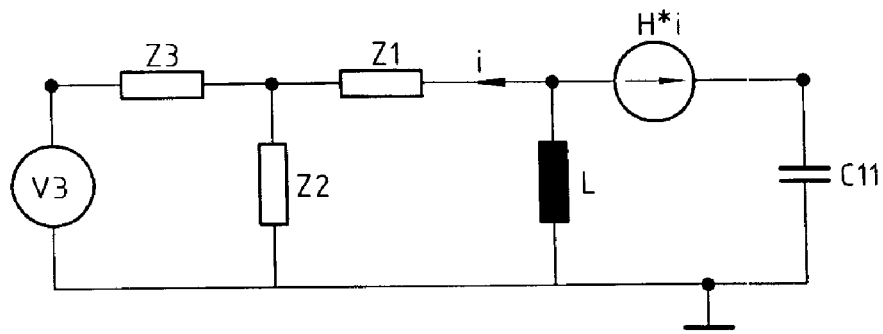
Figure 3D:
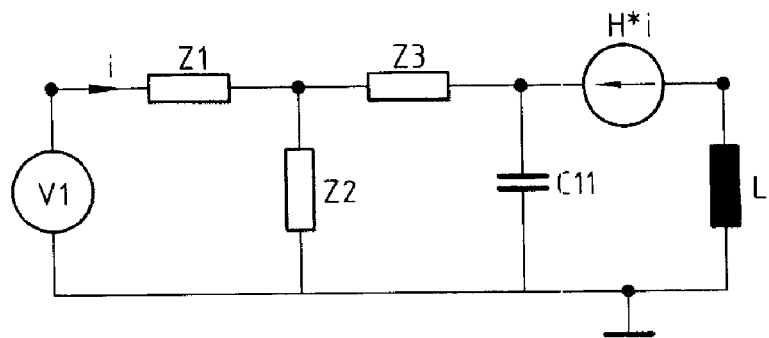

FIGS. 3c and 3d represent the behavior of the amplifier circuit of this embodiment in the case in which the internal feedback, respectively the external feedback are open.

Typically a shunt impedance of less than 100 mR can be created. L1 serves to provide a further attenuation by forming a divider with the LISN.

Figure 2:
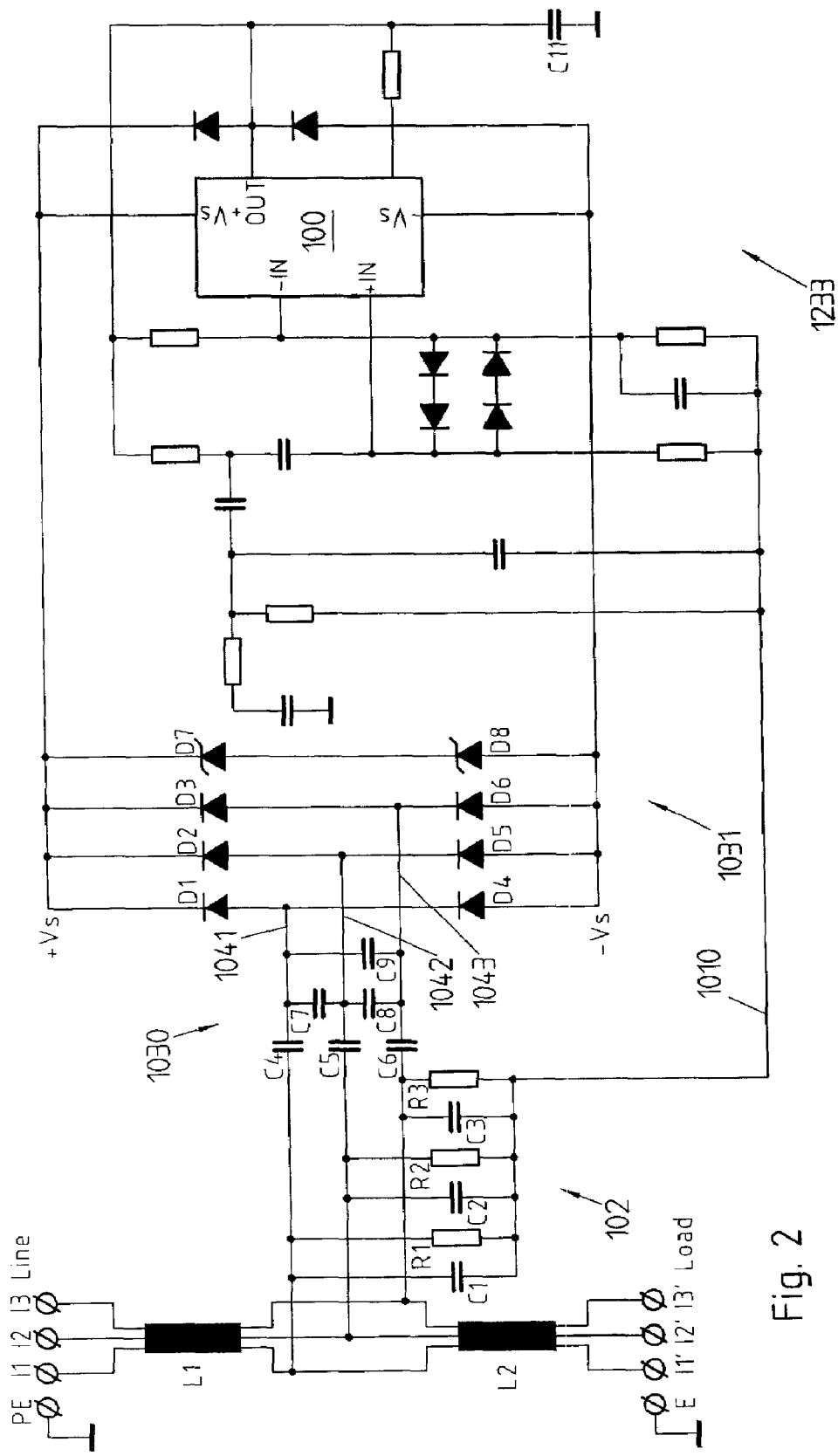
FIG. 2 shows a schematic of a portion of an EMC filter according to another aspect of the invention.

FIG. 2 represents another embodiment of a filter according to the invention. In this embodiment, only portions of the circuit downstream from the points +Vs and -Vs are changed; the voltage divider 1030 and rectifier 1031 used for supplying a DC voltage +Vs, -Vs are similar to the corresponding elements shown on FIG. 1.

In the embodiment of FIG. 2, the gain stages provided by the transistors Q1-Q10 are replaced by a high-voltage integrated, monolithic operational amplifier 100. A fast, high-voltage and high-power operational amplifier is required for this application, preferably the operational amplifier should be based on the MOSFET technology. Bipolar circuits, however, are also possible within the framework of the present invention. The capacitive divider provided by C4-C9 on FIG. 1 limits the risk of amplifier failure.

The inverting input -Vs of the operational amplifier 100 is connected, for the frequency interval where the noise is expected, to the star-point 1010. The feedback acts in the sense of maintaining this point to a fixed potential, close to the reference potential. The current path is provided by the operational amplifier 100 and the certified Y capacitor C11 connected to its output. In this way, the common-mode noise current circulates from the lines I1-I3, I1'-I3' via the impedances L1 or L2, the voltage dividing capacitors C4-C9, the bridge diodes D1-D6 on FIG. 1, the power operational amplifier 100 and the capacitor C11.

The effect of the active filter circuit is that the value of the capacitor C11 appears, at noise frequency, many times larger than the impedance of the capacitor itself, for example 100 times larger. A relatively small capacitor C11, with a little leakage and volume, can be employed.

According to one aspect of the invention the amplifier 100 and the network 101 of the shunt module 10 may be seen as a transconductance amplifier, which has an output current dependent from the input voltage at the star point 102. The transfer function is so chosen that very little current is drawn in the shunt module at DC or at mains frequency, while the shunt module has low impedance in the frequency range where noise attenuation is desired, typically between 130 kHz and 1 MHz.

Optimally the impedance in the attenuation range is real, in order to dissipate rapidly the energy of the noise component, without unwanted oscillations. Typically impedances of 1 ohm or less are obtained.

Due to the very low impedance in the active filter, the impedances L1, L3 can be much lower than in a passive filter of equivalent performances, and these coils can be kept simple and small, for example they can consist of a straight wire section in a ferrite bead or in a suitable magnetic core, or can contain only a limited number of turns, for example only one or two turns, around a magnetic element, for example around a ring core. Current-compensated impedances, in which several phases are wound around a common core, are preferred.

The voltage-clamping diodes D7 and D8 provide overvoltage and polarity-reversal protection, whereas the low-capacitance diodes D11-D13 are used for input protection, with a minimal power loss.

Overloading or oscillation of the operational amplifier 100 automatically implies a drop in its supply voltage, due to the power limitations imposed by the voltage divider C4-C9, thereby limiting the possible damages. The capacitor C11 is dimensioned to withstand the eventuality of a short circuit of the amplifier output, without the need of security fuses. The T-arrangement of the inductances L1 and L2 further reduces passive du/dt and di/dt values at the input of the amplifier.

The active circuit section 1233 of this embodiment, as visible on FIG. 23, is equivalent to the combination of elements 101, 102, and 1032 of the circuit of FIG. 1.

Other security features can be added in order to further protect the active filter of the invention against external disturbances, like for example lightning, RF disturbances, electrostatic discharges, electromagnetic pulses, and also against powerline anomalies, like overvoltages, missing phases etc.

A further advantage of the device of the invention is that it does not include transformers at mains frequency or electrolytic capacitors, which are notoriously unreliable and subject to aging.

The active filter of the invention preferably also comprises elements 1032 for monitoring and detecting anomalous conditions, for example the collapse of the rail-to-rail voltage at the output of the bridge of diodes D1-D6, can be used to signal an anomalous condition like, for example, an oscillation or a component failure. An anomalous offset at the output or at the input of the amplifier could also be monitored for detecting a failure of a filter component.

In the event of an anomaly, detected for example by a variation in the supply voltage or in the output voltage of the operational amplifier, an appropriate signal may be sent out in order to trigger corrective actions. The circuit of the invention may comprise a light transducer, for example a LED, or an acoustic transducer, for example a loudspeaker or a buzzer, for emitting a luminous alarm signal or an acoustic alarm signals.

The active filter can optionally include a signal output connection, for transmitting a status signal to a remote receiver. Such status signal may comprise, in a simple case, a simple "OK" flag, indicating that all the monitored parameters are within their respective safe ranges, or more elaborate data, providing detail on various operating parameters like current, power, voltage, noise level and temperature.

Preferably, the signal output connection comprises an insulated output, for example a relay output, a photocoupler output, a light fiber output, or an interface for sending messages over a telecommunication network, for example over a wireless data network, a field network or a power line communication network. The remote receiver has thus the possibility to verify the correct functioning within prescribed operating limits of a number of EMC filters according to the invention.

The remote receiver may be a part of a control system, which is set up to take adequate safety measures, in the event of an anomalous condition, like overload, overtemperature, or overvoltage, either according to an automatic program, or at the initiative of an operator.

Optionally, the filter of the invention can provide means, for example a relay, to switch itself off autonomously in case of a detected anomaly, for example if power or temperature admissible functioning limits are exceeded, or in case of failure.

Optionally, the DC voltage generated by the voltage divider C4-C9 and the bridge diodes D1-D6 can be used to generate an auxiliary voltage which is employed for supplying some of the filter's components, for example the monitoring and detection system described above.

Advantageously, the auxiliary voltage so generated may be made available for powering components external to the filter, for example lamps, batteries, or other electronic circuitry. Preferably, the optional supply is made safe and stabilized to some standard value, like 5, 12, 24 or 48 V, by means of an appropriate DC-DC converter. Since the auxiliary voltage is galvanically isolated from the mains lines, thanks to the voltage divider C4-C9, the risk of failures and breakdowns is avoided.

The filter of the invention may advantageously be employed as EMC suppressor at the input or output of frequency converters, as a network filter, or for any other device connected to a powerline.

The illustrated embodiment shows a 3-phase filter circuit. Active monophase filters including a frequency divider and a rectifier according to the invention may also be built.

The filter of the invention may also be employed on DC power lines, for example after the power supply in an electronic appliance, or in automotive applications.

Figure 5:
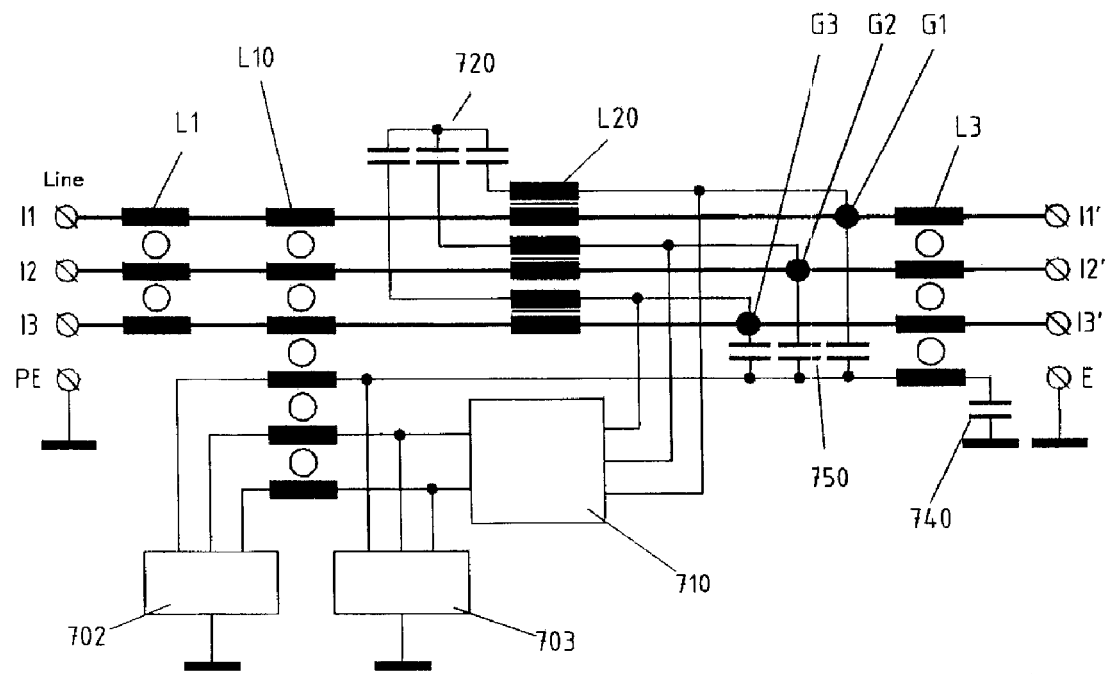
FIG. 5 shows, in bloc diagrammatic form, an EMC active filter according to an aspect of the invention.

According to another aspect of the invention, represented in FIG. 5 the filter comprises a first and a second inductive element; L1, L3, analogically to the previous embodiments, placed in series along the power lines I1, I2, I3, I1', I2', I3'. In addition to that, the filter of the invention also comprises additional inductive elements, L10, L20, whose function is to inductively couple the power lines and the shunt circuit, constituted by the power supply 710, by the active modules 702 and 703, which may be identical, and by the capacitor bank 720. To this purpose the inductive elements L10 and L20 have secondary windings inductively linked to the power lines.

To simplify the realization, the turn ratio of L10 and L20 can be 1:1, which means that the emf voltage of the secondary windings equals that of the primary windings. The invention however is not limited to this particular turn ratio.

In the example of FIG. 5 the inductive element L10 has a common magnetic circuit to which all the power lines and secondary winding are coupled and is arranged for maximal transfer of a common mode signal from the power lines to the shunt active modules 702 and 703.

At the same time inductive element L20 has a separate magnetic circuit for each power line and is arranged to provide a shunt path for differential mode signals towards the capacitor bank 720. Other disposition are however possible and comprised in the scope of the present invention.

Inductive elements L1, L3, L10 and L20 may be realized by means of magnetic cores, for example made of ferrite, permalloy, sintered metal or laminated steel, according to a variety of shapes and dispositions available in the art. In a particularly advantageous realization the inductive devices are obtained by passing the power cables into magnetic beads.

The filter represented in FIG. 5 is a two-stage low-pass filter with active shunt elements constituted by amplifiers 702 and 703. In fact connecting the second amplifier 702 behind the inductive device L10 is equivalent to connecting it between L1 and L10 via another bank of 'X' capacitors like in FIG. 6a, because the voltage drop on the secondary windings of L10 is equal or proportional to that present in the power conductors I1, I2, I3 when traversing L10. The second shunt module 702 thus sees the same noise that it would experience if connected between L1 and L10 (with a multiplicative factor to the value of L10 in the case of a turn ratio different from unity).

In the same way connecting the capacitors 720 at the secondary windings of the inductive device L20 is the same, in term of filter response, than placing the capacitors bank 720 between L10 and L20.

The inductive device L10 create virtual shunt nodes H1, H2, H3, which are electrically equivalent to the section of the phase conductors I1, I2, I3, respectively, between the chokes L1 and L10. The inductive device L20 create virtual shunt nodes H4, H5, H6, which are electrically equivalent to the section of the phase conductors I1, I2, I3, respectively, between the chokes L20 and L10.

By 'virtual shunt nodes' are intended, in this application, nodes of an electric network of a power filter, which are equivalent, for the purpose of connecting shunt elements, to a node of the power line to which they are inductively coupled.

It will be appreciated that the inductively coupled shunt of the invention requires only one galvanic connection point G1, G2, G3 for each phase of the power cable, and only one bank of "X" capacitors 750 for the coupling of the common mode filter stages provided by amplifiers 702 and 703. This allows for a simpler and more reliable realization, particularly in the case of multi-stage filters, like the filter presented in this example.

Figure 7:
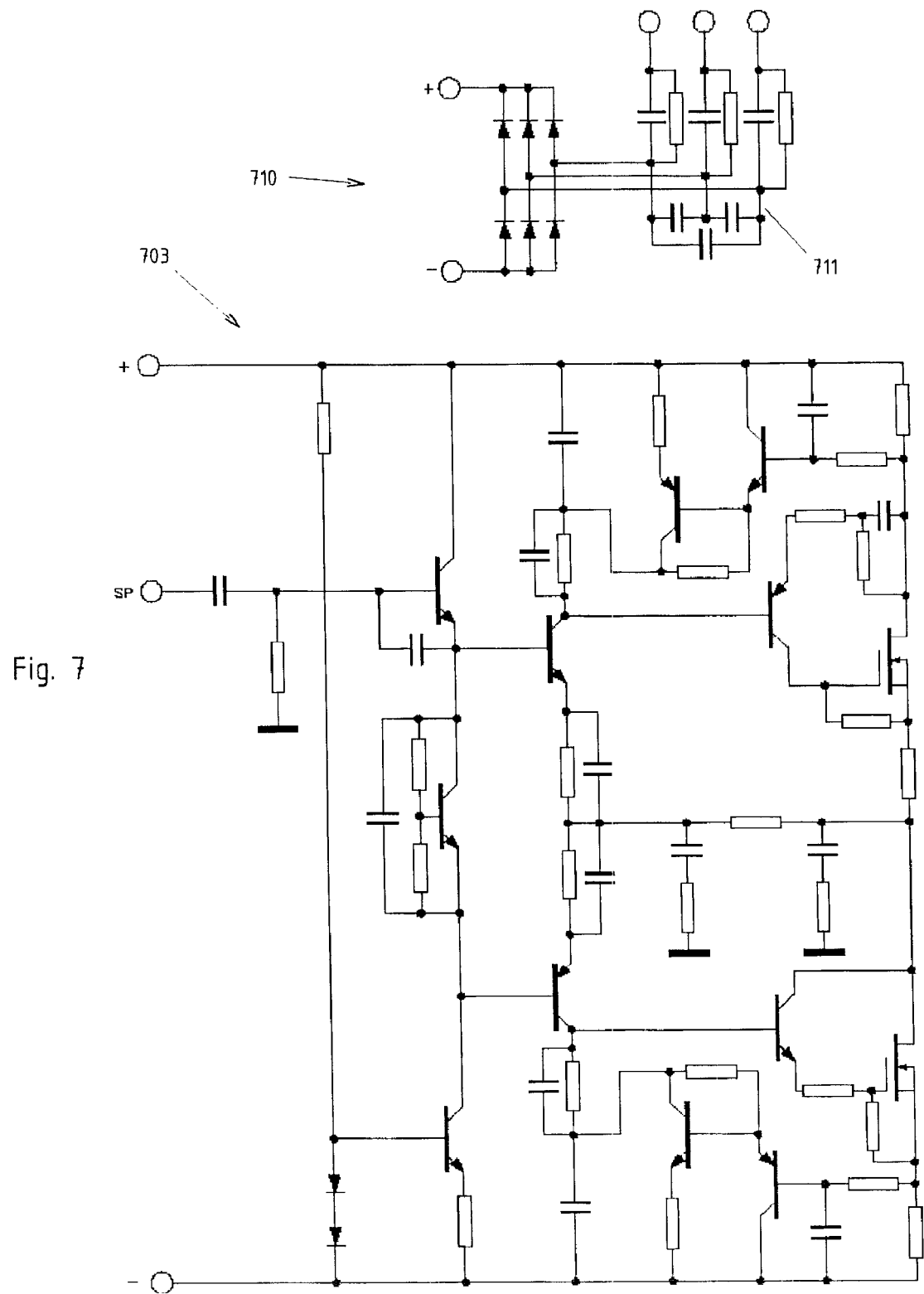
FIG. 7 shows an active shunt module of the filter of FIG. 5.

FIG. 7 shows an example of realization of the power supply 710 and of the active module 703. The power supply 710 comprises, like in the previous case, a voltage divider 711, capacitively realized, for reducing the voltage and current supplied to the active modules 712 and 703.

The active module 703, which is has the same layout as the active module 702, comprise a power MOSFET output stage The active modules 702 and 703 are transconductance amplifiers, with an output current dependent from the input voltage at the input point SP. The transfer function of the active modules 702 and 703 is so chosen that very little current is drawn at DC or at mains frequency, while the shunt module presents a low impedance in the frequency range where noise attenuation is desired, typically between 130 kHz and 1 MHz.

Optimally the impedance in the attenuation range is real, in order to dissipate rapidly the energy of the noise component, without unwanted oscillations. Typically impedances of 1 ohm or less are obtained.

Due to the very low impedance module in the active filter, the impedances L1, L2 can be much lower than in a passive filter of equivalent performances, and these coils can be kept simple and small. The active modules 702 and 703 also induce a much lower leakage current than a conventional capacitor bank.

Figure 6:
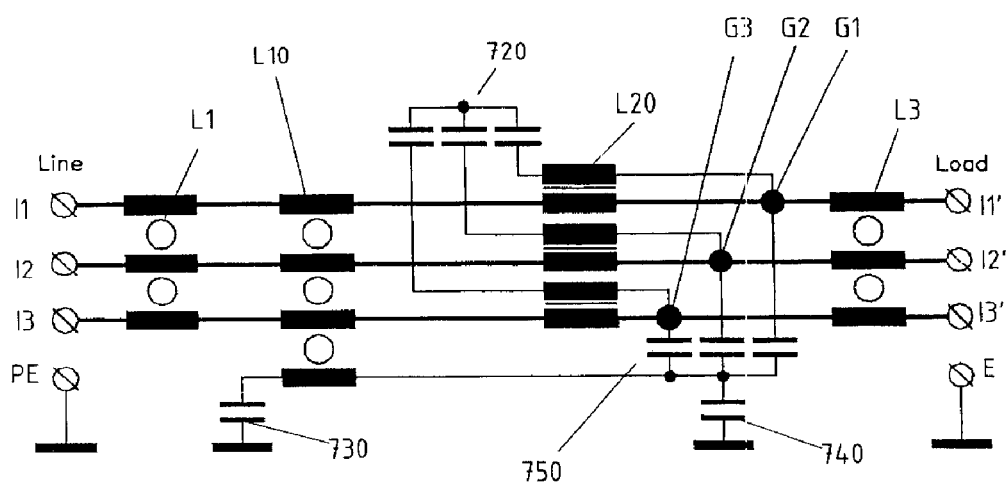
FIG. 6 shows a variant of the filter of FIG. 5 according to another aspect of the invention.

With reference to FIG. 6, according to a variant of the invention the active modules 702, 703 and the power supply have been replaced by a further capacitor bank 730. This variant of the invention only includes passive elements and could be advantageous where a higher leakage current is tolerated.

Figure 8:
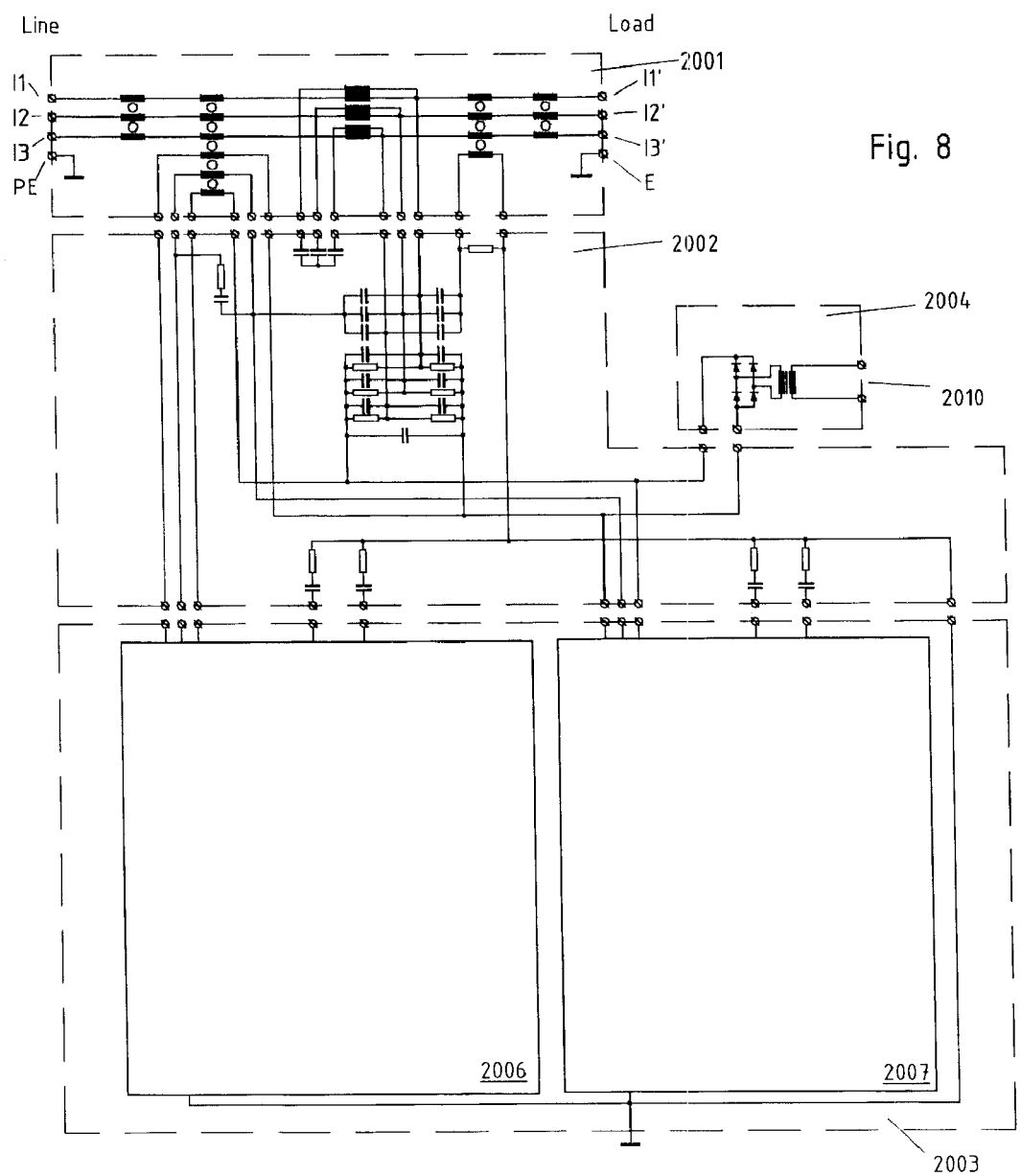
FIG. 8 shows, in bloc diagrammatic form, a modular EMC active filter according to an aspect of the invention.

According to another aspect of the invention, represented in FIG. 8, the filter is realized in a modular fashion, comprising a choke module 2001, a capacitor module, 2002, an amplifier module 2003 and an optional power supply module 2004. The capacitor module 2002 and the amplifier module 2003 correspond to the active shunt module of the previous embodiments.

Figure 9:
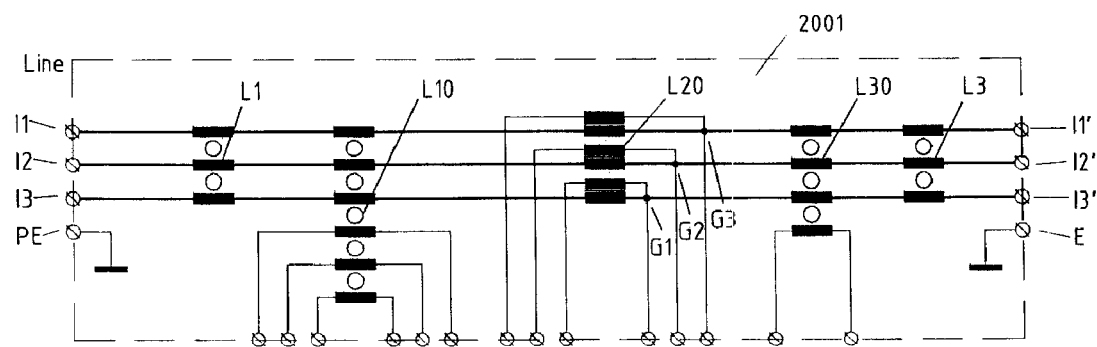
FIG. 9 displays, in diagrammatic form, a choke module of the filter of FIG. 8.

With reference to the FIG. 9, the choke module 2001 comprises a first and a second inductive elements L1, L3, analogically to the previous embodiments, placed in series along the power lines I1, I2, I3, I1', I2', I3'. In addition to that, the choke module 2001 also comprises additional inductive elements, L10, L20, L30, whose function is to inductively couple the power lines and the shunt circuit, constituted the capacitor module 2002 and by the amplifier module 2003.

In the example of FIGS. 5 and 6, the inductive element L10 and L30 are arranged for maximal transfer of a common mode signal from the power lines to the shunt circuit, whereas inductive element L2 does the same for differential mode signals. Other disposition are however possible and comprised in the scope of the present invention.

As before, the inductively coupled shunt of the invention requires only one galvanic connection point G1, G2, G3 for each phase of the power cable. This allows for a simpler and more reliable realization, particularly in the case of multistage filters, like the filter presented in this example. Advantageously the choke module 2001 can adopt solid busbar conductors or insulated cables of adequate gauge for the phases I1, I2, I3.

Figure 10:
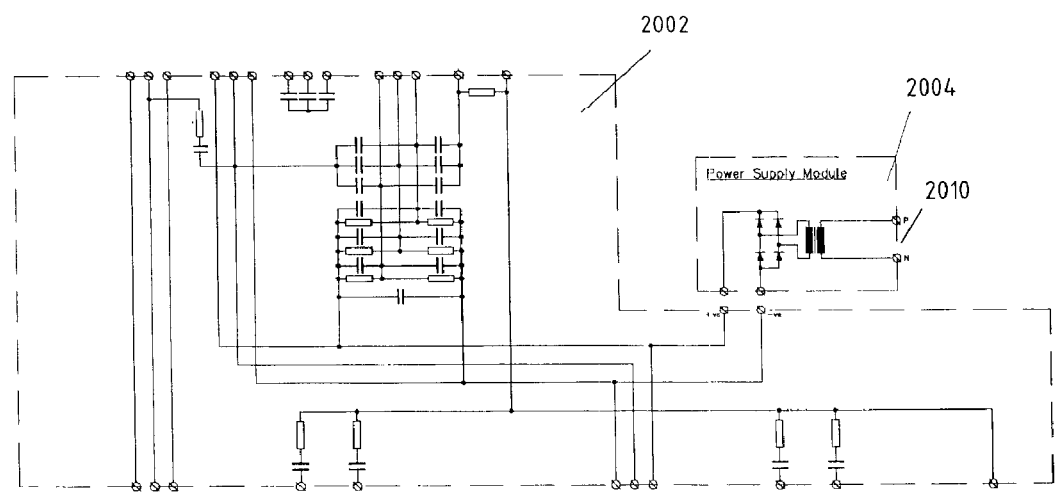
FIG. 10 displays, in diagrammatic form, a capacitor module and a power supply module of the filter of FIG. 8.

FIG. 10 shows a capacitor module adapted for coupling with the choke module of FIG. 9. The capacitor module includes the necessary coupling capacitors for transferring the noise signal to the amplifier module, as well as a bank of capacitor in star configuration for the attenuation of the differential mode noise. The capacitor module comprises, in this variant, a power supply module 2004 comprising a transformer whose output 2010 is available for the supply of the amplifier modules or of other circuits.

In this variant of the invention the supply of the amplifier is provided by a separate transformer 2004 instead of a capacitive divider. This solution is preferable when the power dissipated in the active shunt modules is larger, for example in EMC filters for motors drives with long cables, which have to cope with large noise spikes.

Preferably the transformer used is a step-down transformer, which reduces the line voltage to same convenient value, in order to limit the voltage and power requirement to the active modules.

In power supply module the +Ve and −Ve are imposed between two star points of two identical RC star networks, the two networks forming a three-phase bridge. This way the DC voltage is completely isolated from the AC and vice versa. Also the DC module plays no role in the filtering function of the circuit, the noise being separately transmitted to the SP inputs of the amplifiers.

Preferably the capacitor module is realized on a PCB (Printed Circuit Board) for a simple and economical assembly by conventional soldering techniques. It should be noted that the capacitor module does not have to handle the rated currents at mains frequency. The connection between the choke module 2001 and the capacitor module can be realized by soldering, crimping, or by an electric connector of adequate voltage and current capability. Given the relatively low level of current involved, this connection poses little reliability concerns.

Figure 11:
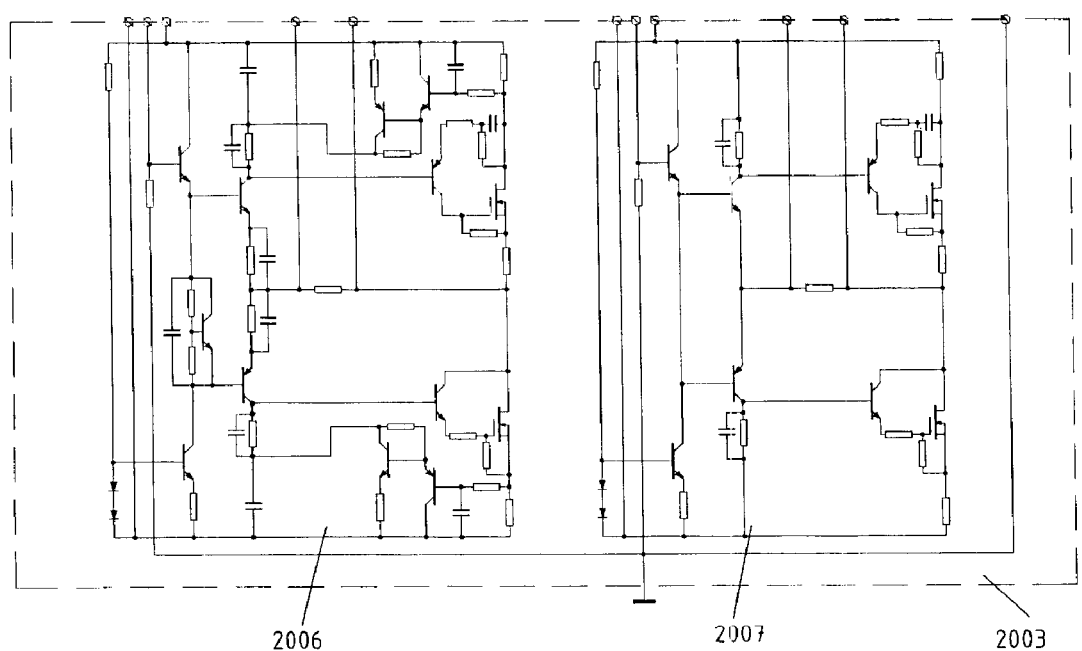
FIG. 11 displays, in diagrammatic form, an amplifier module of the filter of FIG. 8.

FIG. 11 displays an amplifier module 2003 adapted for coupling with the capacitor module of FIG. 10. The amplifier module 2003 comprises two amplifiers, 2002 and 2007, of similar construction, for dissipation of the common mode noise component. These amplifier are preferably realized as hybrid circuits with SMD components on a Al2O3 substrate. The connection between the amplifier module and the capacitor module is done by a conventional electrical connector, or by other appropriate connection means.

The invention claimed is:

1. An EMC filter, for connection between a supply network having phase conductors and an electric operated appliance to reduce conduction noise between said supply network and said appliance, said filter comprising:
   a rectifier, for converting an AC voltage supplied by the supply network into a DC voltage,
   a voltage reducing circuit, for reducing said DC voltage, wherein said voltage reducing circuit comprises a voltage divider having a first set of capacitors and a second set of capacitors in a delta arrangement. each of the first set of capacitors directly connected to a respective one of the phase conductors of the supply network and each of the second set of capacitors connected between the first set of capacitors and the rectifier; and
   an electronic active circuit, supplied by said reduced DC voltage, for absorbing a noise current transmitted between said supply network and said appliance.

2. The filter of claim 1, wherein said voltage reducing circuit is connected to said supply network and supplies to said rectifier an AC voltage lower than a voltage of said supply network.

3. The filter of claim 1, wherein said voltage reducing circuit is made up of delta-connected passive elements.

4. The filter of claim 1, wherein said rectifier comprises a bridge of diodes.

5. The filter of claim 1, wherein said rectifier comprises an AC-DC converter.

6. The filter of claim 1, wherein said active electronic circuit comprises an integrated operational amplifier.

7. The filter of claim 6, wherein said operational amplifier is a MOSFET amplifier.

8. The filter of claim 6, further comprising security elements for protecting the amplifier against overvoltages, fast or important du/dt or di/dt variations, and/or for detecting and transmitting anomaly conditions.

9. The filter of claim 1, further comprising monitoring means for detecting a malfunctioning of said filter.

10. The filter of claim 9, wherein said monitoring means are arranged to detect a variation in said DC voltage.

11. The filter of claim 9, wherein said monitoring means are arranged for detecting a variation in an output terminal of an amplifier comprised in said active circuit.

12. The filter of claim 9, wherein said monitoring means generate a status signal and wherein said status signal is connected to the input of an acoustic or an optical transducer of said filter.

13. The filter of claim 9, wherein said monitoring means generate a status signal and further comprising a status output connection, for transmitting said status signal to external components.

14. The filter of claim 6, wherein said operational amplifier is a MOSFET amplifier, further comprising a supply output connector, connected to said DC voltage.

15. The filter of claim 14, further comprising an isolated DC-DC converter, said supply output connector being connected to an output of said DC-DC converter.

16. The filter of claim 1, wherein said operational amplifier is a MOSFET amplifier, further comprising at least one inductor, connected between said supply network and said electric operated appliance, wherein said inductor comprises an essentially straight conductor section in a magnetic core.

17. The filter of claim 1, wherein said operational amplifier is a MOSFET amplifier, further comprising at least one inductive means, connected between said supply network and said electric-operated appliance, wherein said inductor comprises one or two turns, around a magnetic element.

18. The filter of claim 1, further Comprising a star-point circuit including passive elements connected between each power supply line of said supply network and a star-point, wherein the current flowing through said electronic active circuit depends on the potential on said star-point circuit.

19. The filter of claim 1, comprising at least one inductive device connected to the power supply lines in a manner to transfer inductively the noise current to the electronic circuit.

20. The filter of claim 19, in which said inductive device comprises secondary windings, inductively coupled to the power lines.

21. The filter of claim 20, in which said inductive device comprises a common magnetic circuit coupled to all phases of the power line, for coupling a common mode noise current.

22. The filter of claim 20, in which said inductive device comprises independent magnetic circuits individually coupled to each phase of the power line, for coupling a differential mode noise current.

23. The filter of claim 1, wherein the electronic circuit is connected to a virtual shunt node inductively associated to a node of the conductors lines of the supply network.

24. The filter of claim 1, wherein each of the capacitors of the second set of capacitors is connected to two capacitors of the first set of capacitors.

25. An EMC filter, for connection between a supply network and an electric operated appliance to reduce conduction noise between said supply network and said appliance, said filter comprising:
   a rectifier, for converting an AC voltage supplied by the supply network into a DC voltage,
   a voltage reducing circuit, for reducing said DC voltage, wherein said voltage reducing circuit comprises a voltage divider having a first set of capacitors and a second set of capacitors in a delta arrangement, each of the first set of capacitors directly connected to a respective one of the phase conductors of the supply network and each of the second set of capacitors connected between the first set of capacitors and the rectifier;
   an electronic active circuit, supplied by said reduced DC voltage, for absorbing a noise current transmitted between said supply network and said appliance; and,
   at least one inductive device connected to the power supply lines in a manner to transfer inductively the noise current to the electronic circuit, wherein said at least one inductive device comprises secondary windings, inductively coupled to the power lines.

* * * * *